United States Patent
Gould

(10) Patent No.: US 8,588,402 B2
(45) Date of Patent: Nov. 19, 2013

(54) METHOD AND SYSTEM FOR PROVIDING POWER AND DATA OVER A VOICE GRADE/POTS INFRASTRUCTURE FOR USE IN COMMUNICATING WITH AND/OR CONTROLLING MULTIPLE REMOTE NETWORK AND NON-NETWORK DEVICES

(76) Inventor: Stephen H. Gould, Melbourne Beach, FL (US)

(*) Notice: Subject to any disclaimer, the term of this patent is extended or adjusted under 35 U.S.C. 154(b) by 1369 days.

(21) Appl. No.: 12/258,419

(22) Filed: Oct. 26, 2008

(65) Prior Publication Data
US 2009/0116625 A1 May 7, 2009

Related U.S. Application Data

(60) Provisional application No. 60/983,036, filed on Oct. 26, 2007.

(51) Int. Cl.
*H04M 3/00* (2006.01)
*H04M 11/00* (2006.01)

(52) U.S. Cl.
USPC ............... 379/322; 379/93.05; 379/93.09

(58) Field of Classification Search
USPC ............ 379/322–324, 93.05–93.07, 93.14, 379/100.15–100.16, 93.09, 93.11; 700/20–22
See application file for complete search history.

(56) References Cited

U.S. PATENT DOCUMENTS

2003/0068033 A1* 4/2003 Kiko ........................ 379/413

* cited by examiner

*Primary Examiner* — Wesley Kim
*Assistant Examiner* — Nam Huynh
(74) *Attorney, Agent, or Firm* — John L. DeAngelis; Beusse Wolter Sanks Mora & Maire, P.A.

(57) ABSTRACT

A system and method for providing data services and controllable power to each one of a plurality of end points in a structure. The system comprises a network, a source of power, a concentrator connected to the network and remote network devices/controllers connected to the network with a remote network device/controller located at an end point. The remote network devices/controllers receive power from the source of power and supply controllable power to one or both of networked and non-networked controlled devices connected to the remote network devices/controllers. The networked controlled devices send data to and receive data from the remote network device/controller, and data is communicated between the remote network device/controller and the concentrator. The power supplied to the networked and non-networked controlled devices is controlled at the source of power or at an associated remote network device/controller.

4 Claims, 2 Drawing Sheets

METHOD AND SYSTEM FOR PROVIDING POWER AND DATA OVER A VOICE GRADE/POTS INFRASTRUCTURE FOR USE IN COMMUNICATING WITH AND/OR CONTROLLING MULTIPLE REMOTE NETWORK AND NON-NETWORK DEVICES

This patent application claims the benefit under Section 119(e) of the provisional patent application assigned Application No. 60/983,036 and filed on Oct. 26, 2007.

FIELD OF THE INVENTION

This invention relates generally to a system for supplying power and data over a voice grade POTS (plain old telephone system) infrastructure for communicating with and/or operating multiple remote network devices and low voltage equipment.

BACKGROUND OF THE INVENTION

It is desired that buildings having multiple similar rooms, hotels, multi-tenant dwellings, office buildings and hospitals for example, provide convenient data and power connections for one or more network and electrical devices. The rooms tend to be similar in purpose and typically include similar network and electrical devices. For example, all hotel rooms have occupant-controlled lights, a heating/air conditioning system (controlled by a thermostat) and a television. Certain of these rooms may include a data port for connection to a computer or another information processing or network device.

Although room guests (patients, occupants, etc) control the various room devices as desired, when the occupant leaves the room the ability to control in-room devices is lost. Controllers are available for controlling certain devices within each room, but control is typically based on time-of-day and cannot be optimized according to external factors, such as outside temperature or whether the occupant has left the room.

Most hotels and hospitals have a private branch exchange (PBX) that connects all wire-based telephones within the building(s), while most large buildings and complexes have a unified phone infrastructure. The PBX can provide certain telephone control features within the building, such as call transfer and call forwarding. In describing and demonstrating the invention below, a PBX device in the POTS infrastructure is assumed, however, in another embodiment of the invention the private branch exchange functionality comprise a subsystem that can coexist with the system of the invention. The infrastructure may be operating a PBX, or public phone system or no voice communication at all, as presented below where the voice communication is implemented via a Voice-over-IP technique.

Conductors, often copper wires, are distributed from a central location throughout a facility and are most often terminated at a connector in a face plate, nominally, in each room of the building. A handset is connected to the connector. Terminal blocks or telephone blocks for connecting the conductors are interposed between the PBX switch and the connector. In many installations the final "leg" of the infrastructure is completed with a Cat 3 (POTS grade wiring); Cat 5, Cat 5e, or Cat 6 (data network grade wiring). For clarity, all descriptions herein will reference Cat 3, a three pair (six wire) cable as the wiring utilized for the final leg of the POTS infrastructure.

FIG. 1 illustrates the aforementioned legacy POTS system 8, including a PBX switch 10 connected to terminal blocks 14 with a cable 16 (e.g., 50, 100 or 400 conductor pairs (voice pair conductors) within the cable 16). As can be seen, the terminal blocks 14 are configured in a branching pattern from the PBX switch 10. Face plates 20 support an associated connector 22 that is connected to final terminal blocks 14 with a Cat 3 conductor 23. Each face plate 20 and its associated telephone connector 22 is located in a different room of the building, e.g., hotel. Depending on the installation, there may be any number of terminal blocks 14 between the PBX switch 10 and the connectors 22.

A group of rooms, for example, each floor of an existing building, has a telephone room that aggregates the wiring to face plates 20 within a given area, in this example each floor. All telephone room connections are in turn aggregated, ultimately into a logical, if not physical, single building telephone room. Physical attributes of a location, e.g., multiple buildings, floors, meetings spaces, general locale, drive the design and layout of the wiring, the connectivity of voice pair conductors and spare conductor provisioning. Over time, these structured solutions have become more complex as the result of long (typically non-engineered) maintenance, technology upgrades and sometimes even a system redesign.

The present invention overcomes problems and limitations inherent with the current systems for delivering phone and data services to an individual room, such as a hotel room and for controlling electrical devices and system components within the room. The present invention provides expanded features and delivers phone service, data service and controllable power to each individual room.

BRIEF DESCRIPTION OF THE DRAWINGS

The present invention can be more easily understood and the further advantages and uses thereof more readily apparent, when considered in view of the following detailed description when read in conjunction with the following figures. In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 1:
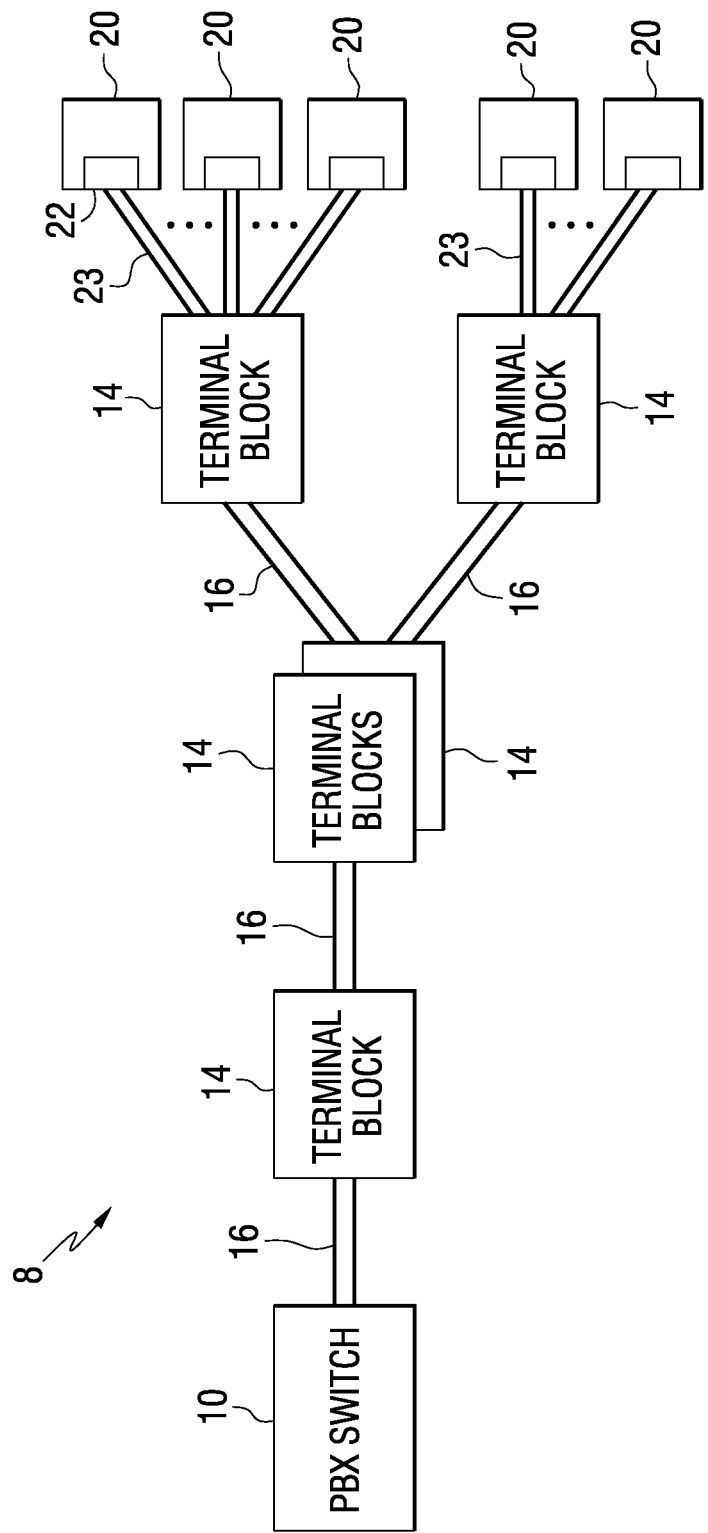
FIG. 1. is a block diagram illustrating a prior art telephone system.

Before describing in detail the particular methods and apparatuses for communicating with and/or controlling multiple remote network and non-network devices in accordance with various aspects of the present invention, it should be observed that the present invention resides primarily in a novel and non-obvious combination of hardware, method steps and software elements related to said method and apparatus. Accordingly, the hardware, method steps and software elements have been represented by conventional elements in the drawings, showing only those specific details that are pertinent to the present invention so as not to obscure the disclosure with structural details that will be readily apparent to those skilled in the art having the benefit of the description herein.

The following embodiments are not intended to define limits of the structures or methods of the invention, but only to provide exemplary constructions. The embodiments are permissive rather than mandatory and illustrative rather than exhaustive.

In view of the limitations present in the prior art devices, the present invention provides a new, non-obvious and useful IntraLAN network system and method for use in a structure having multiple similar rooms. The rooms are referred to herein as "remote locations." The system provides controllable power and data, over a voice grade POTS infrastructure of the structure, to multiple remotely located network devices (i.e., configured in a network) and low voltage remotely-located non-network devices. Each remote location, e.g., each room, has one or more network and non-network devices. The non-network devices require power to operate but are not capable of receiving data from the network and sending data into the network. The network devices are configured into a network in the structure or within proximate structures.

The network and non-network devices located in each room of the structure are connected to a remote network device/controller (RND) also located at the same remote location, i.e., in the same room. The RND provides data access to the network devices and supplies the controllable power to the network and non-network devices.

The invention supports advanced power management features as the power supplied to both the network devices and the non-network devices in a room is controllable according to power control commands sent over the network to the RND to which the devices are connected. The commands can originate from either a source internal to the network or from a source outside the network. By controlling the supplied power, the system can remotely manage, monitor and test the supplied power in each room.

Through consolidation of these power management features into a cohesive infrastructure function, the system eliminates ad hoc techniques of connecting individual devices to the network and configuring the devices to overcome shortcomings of an existing infrastructure. The invention thus provides a novel integration of the infrastructure and its functionality. This feature avoids the need to reduce the number and/or performance attributes of available functions due to a flawed infrastructure.

The remote location referred to herein may comprise an end-point where power control (and Internet and phone services) are desired (e.g., a hotel room or a room in a multi-tenant dwelling). The RND at each remote location comprises a power distribution bar to which each network and non-network device is individually connected at an independent power port. By individually and independently supplying power to these devices, the power supplied to any one device can be controlled. The power distribution bar also supplies power to devices integrated within the RND. Since the RND can supply (and control) power to any number of devices at the remote location, it is unnecessary for these devices to be connected to an independent power source (a wall outlet in a hotel room, for example) to receive power.

The power delivered to each device may be individually and independently controlled from a remote web-based power management source. This control can be exercised responsive to power management commands received at the power source (referred to as a device controller/power injector in the description below) or such commands received at the RND. The available power management features, each responsive to a power control command may include, but are not limited to: power on/off control, cycling the power, power port management, watch-dog monitors to ensure operational capabilities of the remote network device, local and remote power port functionality logging and reporting, power cycling at programmable threshold levels, status based power cycling and automatic timers to automate regular and reoccurring power cycling. Further, these power management features are device specific, i.e., the power supplied to each device receiving power from the RND can be individually and independently controlled. The system therefore minimizes the need for local (manual/human) power control and maintenance efforts.

Thus the system of the present invention includes innovative techniques for powering remote devices and providing remote power management of those devices (i.e., status monitoring, configuration management, administrative access and management of functional capabilities) and remote power control.

Advantageously, the IntraLAN system can provide power and data over a voice grade POTS infrastructure and thus overcome the many known deficiencies of the prior art systems and devices. The system's modular approach allows the power and power management capabilities provided over the POTS infrastructure to be located at distributed points that are within distance limitations governed by wire resistance and data distortion. Alternatively, the power can be supplied from a local power source (where local refers to the site of the RND).

The system of the present invention also forms an intranet/local area network infrastructure that provides a vehicle for designing, building, and integrating both customized and conventional network devices to operate as a unified system with high speed Internet access (operating according to a TCP/IP protocol, for example). The IntraLAN system augments and upgrades a structure's legacy network infrastructure. The IntraLAN system can accommodate different types of legacy network infrastructures, e.g., a local area network, a minimal POTS type infrastructure (where the advantages offered by the present invention tend to be the greatest). Since the system also supplies power to the network and non-network devices, the system delivers, operates, monitors and controls advanced networking services, tools, and operations.

The RND serves as the network hub at each remote location, e.g., at each room of a multi-room structure. The RND provides multiple Ethernet connections, allowing integration of additional data systems such as, IEEE 802.11x, WiFi, Bluetooth, voice-over-IP (VOIP), TV-over-IP (TV/IP), video-on-demand (VoD or VOD), environmental control systems, emergency monitoring and additional remote services. The RND can also provide network ports for individual use, i.e. a guest connection in a hotel room. The IntraLAN system also provides TCP/IP control features such as: bandwidth management, IP address assignment and Layer 2 isolation between systems and subsystems.

Layer 2 isolation, sometimes referred to as a VLAN or virtual local area network, provides a non-physical segregation of a device/subsystem and its data. For example, a hotel guest's device can coexist with and its data travel on the same network as the VOD and the VOD data. But the VOD device and its data are not accessible to the guest because the network operates on a "virtual" LAN and each LAN is operated independently. These VLAN features tend to be important at the end points. A room guest cannot see the VOD traffic and the guest cannot see the VOD device (and therefore cannot access the login screen of the VOD controller). Therefore, each device on the IntraLAN network can exist on a virtual LAN and it's data traffic and individual devices are not readily discoverable.

In one embodiment, the present invention utilizes "point-to-multi-point" VDSL or VDSL2 communication solutions.

The system comprises at least one head-end data/voice concentrator for combining the voice and data signals. In one embodiment the data/voice concentrator comprises a 24 port data/voice concentrator working in tandem with 24 modems providing voice and data communications with remote network devices.

Typically, as in any TCP/IP network, the data is broadcast from the data/voice concentrator to all RND's. Using the address supplied with the data, the appropriate RND serving that address responds and passes the data to the addressed device. In another embodiment, a specific data/voice concentrator has learned that a device with address ABCD has received data through a particular RND XYZ connection. The data/voice concentrator then intelligently routes the data destine for device ABCD to the remote network device XYZ. In this embodiment it is not necessary for the data/voice concentrator to blindly broadcast the data to all remote network devices.

To perform its network related functions, each RND includes a modem and a plurality of additional modular components that take advantage of the available high bandwidth IntraLAN communications network and the available Internet infrastructure accessible through the IntraLAN. Devices that can be connected or integrated into the network include, but are not limited to, multi-port TCP/IP devices, multiple Ethernet connections, IEEE 802.11x WiFi access points, Bluetooth devices, video-on-demand devices, voice-over-IP devices, TV-over-IP devices, Internet-based environmental control, emergency monitoring and additional remote services. etc. These devices operate as a remote component of a subsystem operating within the IntraLAN system and are connected to the network through the RND. For example, an 802.11 WiFi device would likely receive data and power directly from the RND, whereas a VOD subsystem may be more comprehensive subsystem and not necessitate the full support of the IntraLAN system. A VOD solution may require a VOD set top box in the guest room. The set top box is connected to the RND and receives the video data through the RND network services, however, the set top box may be powered through the RND or from a local power source, dependent on the design of the set top box and whether the set top box supplies power to other associated components, such as a television.

The RND includes hardware and software elements (in one embodiment disposed on a programmable circuit board or PCB). As described herein, the RND performs a variety of functions including, but not limited to, one or more of the following:

a) Supplying the data/voice signals and the power (both of which are supplied through the infrastructure wiring, often comprising Cat 3 POTS grade cabling or Cat 5 network cabling) to "local" devices connected to the RND (i.e., where "local" is with respect to the RND and therefore refers to devices that are at the site of the RND). Power is also supplied to devices within the RND (i.e., devices internal to the RND). The RND also forwards data/voice signals to a VDSL modem (or another type modem dependent on the data protocol).

b) The modem within the RND demodulates/decodes the digital voice and/or data signals. The modem splits the data from the voice and provides two output connections. A first connection comprises a voice signal (i.e., in a voice signal format native to the location's voice service) and a second connection comprises a high speed Internet connection in the form of a TCP/IP Ethernet connection. Other data protocols coupled with a voice signal can also be used according to the invention.

c) Providing up to X (in one embodiment X=4) power ports or connections, within the power capacity limitations of the RND. The RND receives power from the device controller/power injector (referred to above) via the wired infrastructure and supplies the power to the X power ports. The internal modem also receives power from the RND.

d) Automatically switching to an alternative power source (i.e., local AC power) in the event the power supplied from the device controller/power injector is either inadequate or nonexistent, based on the presence and condition of the infrastructure wiring.

According to one embodiment, the device controller/power injector can be located up to about 1000 ft. from the RND. As those skilled in the art understand, locating the device controller/power injector and the RND closer than 1000 feet supports greater power availability via existing cables.

One characteristic of the present invention is the separation of the power supply from the data/voice supply. This permits the head-end data/voice concentrator to be more centrally located (potentially, in one embodiment, up to about 4,500 feet away from each RND) and therefore more easily managed and located.

In addition to disparate distance characteristics for the power and the data, the system provides unique design features that provide special adaptation capabilities to the standard legacy infrastructure. Specifically, in legacy environments available wiring from a central point may not be the full complement of wiring provided to the end point. The solution of the present invention allows for placement of equipment at points where the wiring is available, by design of the original infrastructure implementation. That is, the original legacy system design, implementing only a POTS solution, planned for one conductor pair to be connected from the central telephone room to an end point, a guest room in a hotel, for example. According to the present invention, it is desired for six wires to be available at each end point to fully service the RND. The IntraLAN system components are located to utilize four additional wires, wherever the four wires are introduced into the structure (typically the telephone room nearest to the end point or guest room) to deliver power to the end point.

To further explain the concept, assume that point A is a central phone room, point B is an intermediate phone distribution location and point C is a network end point (e.g., a guest room). Most legacy installations comprise a 100 pair cable from point A to point B. A 100 pair cable is selected based on the following assumption that the intermediate distribution location, point B, supports 40 guest rooms. Since each room requires a cable pair for voice signals, 80 wires are in use providing connectivity for the POTS solution and 20 wires remain to serve as spares for maintenance between point A and point B. From point B to point C the typical installation approach uses individual Cat 3 cables each containing six wires or three conductor pairs. Two of the six wires are "cross connected" at point B to provide connectivity to the original two wires originating from the central phone room point A, thus providing the POTS service to a specific room. The present invention supplies power and power control over the remaining four wires, which, in this example, were introduced in the infrastructure at point B to the end point C through the use of the Cat 3 wiring. Thus the power supplied by the system has to be injected at a point that is at the "head-end" of the individual wiring to a room, point B, anything prior to that point will not have the required wires to carry the power to each individual end point.

One embodiment of the invention comprises a "retro fit" or "after market" system that can be easily integrated with various types of existing infrastructures found in the majority of hotel structures, commercial buildings, schools, multi-tenant dwellings and hospitals. The retro fit embodiment allows rapid deployment of the RND with minimal and non-construction like installation of a surface mounted enclosure housing the RND hardware elements.

The invention is also suitable for new installations that permit pre-wiring of a full compliment of wiring, with planning for spares, etc., and the more centralized location of data concentrator/power injector, thus further simplifying management and maintenance.

Additional embodiments make the IntraLAN system suitable as a solution to the "last mile" problem within housing subdivisions and neighborhoods, both for new construction and retrofits for existing homes/developments. The present invention offers many advantages over existing infrastructure technologies as represented by its many features as described herein.

One embodiment of the IntraLAN system of the present invention comprises the following functional elements: the data/voice concentrator; the device controller/power injector, and the RND. The RND contains the power distribution bar for connection to remote external devices and some combination of a VDSL modem and a multi-port network device. Any physical layout of these devices is considered within the scope of the present invention.

Figure 2:
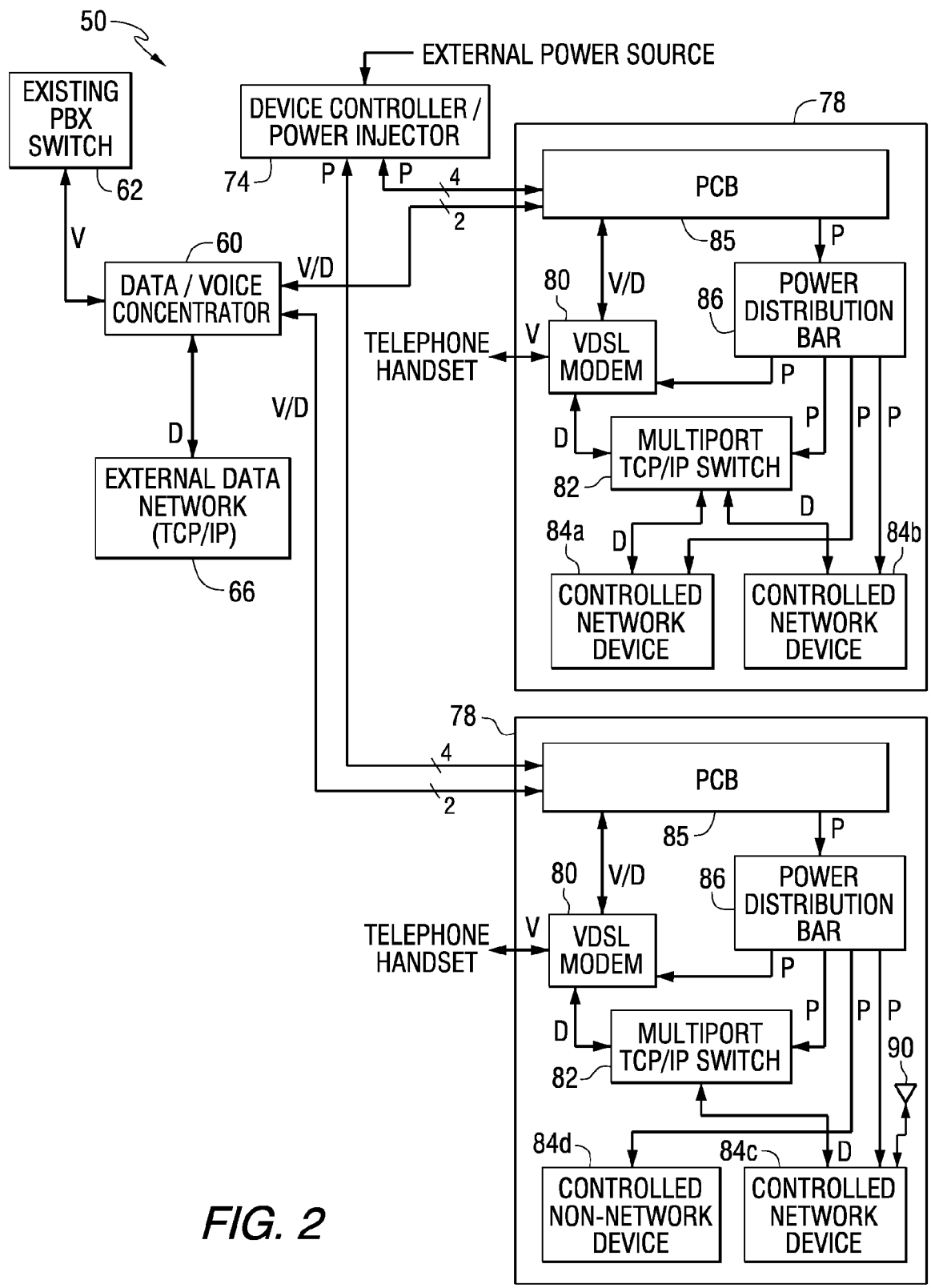
FIG. 2 is a block diagram illustrating a system for providing telephone, data and controllable power to information processing and devices according to the present invention.

FIG. 2 illustrates the primary components of one embodiment of an IntraLAN system 50 of the present invention.

A data/voice concentrator 60 is installed inline (connected to) an existing PBX switch 62 within a building or structure. The data/voice concentrator 60 may be preferably located relatively physically close to the PBX switch 62 that serves an entire property or a plurality of locations that receive telephone service from the same PBX switch. This arrangement centralizes the necessary modifications to the voice telephone system. However, this is not required as the data/voice concentrator 60 can be anywhere in the "line" from the PBX switch 62 to a final termination point.

The data/voice concentrator 60 is also connected to an external data network 66, such as a local area network (LAN). Data input to the data/voice concentrator 60 from the data network 66 can originate from any other network connected to the local area network, such as the Internet or another network.

The data/voice concentrator 60 accepts a voice signal from the PBX system 62 and data from the data network 66 and combines the signals onto the same wire pair to be delivered to an "end point" RND 78.

It should be noted that the IntraLAN system 50 is specifically designed, through the utilization of the VDSL data/voice concentrator 60 and the VDSL modem (an element of the RND 78 to be described further below) to coexist with any existing legacy telephone or data system.

It should also be noted that although FIG. 2 illustrates the various system elements as directly connected, in reality one or more telephone-type terminal blocks (also referred to a punch-down blocks) may be interposed between any two of the system elements.

In another embodiment, the IntraLAN system 50 includes a voice-over-IP feature that utilizes the TCP/IP network as the media for voice service. The introduction of a VoIP phone system operating over the IntraLAN 50, made possible by the unique features of the invention, may cause migration of the data distribution technology to a different and perhaps more efficient or cost effective technology. As an example, in an embodiment using a VoIP telephone system, the requirement to concurrently support POTS voice traffic and data may not exist, allowing the system 50 to employ other data distribution techniques such as long range Ethernet (LRE) or pure DSL Internet "data only" devices over the POTS infrastructure.

Continuing with FIG. 2, in one embodiment a device controller/power injector 74, responsive to a power source (an AC power source, for example), injects low voltage/low current power into the voice grade telephone wiring (two conductor pairs or four wires) found in most existing building infrastructures. In one embodiment the device controller/power injector 74 is connected to a web interface for supplying signals that control the power management functions of the device controller/power injector 74. In an alternative embodiment the web interface is absent and the device controller/power injector 74 is programmed to perform power management functions.

The power-carrying conductors comprise existing wires (or legacy conductors) of an existing POTS infrastructure. The POTS infrastructure thus carries voice and data in the form of VDSL signals and also carries the power. In one embodiment the supplied power comprises up to 48V at 2 A over four wires (i.e., two two-wire pairs), where the collective four wires (with operational capability with as little as two wires) are referred to as one "port." Given line losses, it is anticipated that with a full compliment of four wires the power at a usable current will be available at up to about 1000 feet for each port.

As illustrated, both the device controller/power injector 74 and the data/voice concentrator 60 supply inputs to the RND 78. The inputs comprise, respectively power and data/voice signals.

The PCB 85 provides connectivity to six wires from the POTS infrastructure. The combined data and voice signals are provided as input to a VDSL modem 80 of the RND 78. The modem 80 separates the voice and data signals and supplies each to an appropriate receiving device. The voice signals are input to a phone handset as illustrated. The data signals (represented by the letter "D" adjacent signal paths in FIG. 2) are supplied to a TCP/IP multiport network device 82, that in turn supplies the data signals to one or more controlled devices 84a, 84b, 84c and 84d. The data includes a device address to ensure that the data is routed to the correct controlled device. The letter "V" adjacent signal paths in FIG. 2 indicates voice signals.

The controlled devices comprise both networked controlled devices 84a, 84b and 84c) and a non-networked device 84d. The controlled devices 84a, 84b, 84c and 84d are connected to a power distribution bar 86 of the RND 78, as illustrated, for receiving operating power (represented by the letter "P" adjacent signal paths in FIG. 2). The power distribution bar 86 further comprises a power splitter for splitting the power to the various power ports of the power distribution bar 86.

The networked controlled devices 84a, 84b, and 84c receive and send data via the multiport network device 82. The controlled networked device 84c comprises a wireless access point with an antenna 90.

One embodiment of the system 50 further comprises a converter to inject power from the power distribution bar 86 into an Ethernet jack to provide power-over-Ethernet to one of the networked controlled devices 84a, 84b and 84c that is configured to operate as power-over-Ethernet device, not depicted in FIG. 2.

The RND 78 also comprises a programmable circuit board 85 that provides the RND functionality and controls the various components of the RND 78.

One RND 78 is connected to one data port of the data/voice concentrator 60 and one power port of the device controller/power injector 74. In one embodiment the data/voice concentrator 60 provides twenty-four VDSL ports while one device controller/power injector 74 provides twenty-four power ports thusly working in tandem to support twenty-four RND devices 78 (only two shown in FIG. 2).

Legacy conductors of the system 50 connect the various elements illustrated in FIG. 2. Four power wires (two two-wire pairs) and two DSL/Voice wires (one two-wire pair) comprise six wires (three two-wire pairs), that connect to one RND 78, an RND in a hotel room, for example.

The four DC power carrying wires are designated as two for positive polarity and two for negative polarity. However, the system allows for real-world site problems and can therefore carry the capacity voltage/current and effectively operate over only two wires (one positive and one negative). In this latter case the wire resistance will be higher, reducing the amount of power available and/or reducing the effective maximum distance between the device controller/power injector 74 and the RND 78.

Decoupling the source of power from the device controller/power injector 74 allows the installer the flexibility to install the device controller/power injector 74 in locations (for example, phone closets) close to the RND 78 to minimize power losses in the intervening conductors. The network interface (the data/voice concentrator 60) can be placed in a more appropriate location, for example a main telephone room.

The device controller/power injector 74 controls the power supplied to the controlled devices 84a, 84b, 84c and 84d through the RND 78, e.g., turn power on/off or reboot by turning the power off then back on. The device controller/power injector 74 also controls the power supplied to the internal components of the RND 78, e.g., the VDSL modem 80. In another embodiment power control functionality is present in the PCB 85 and in still another embodiment power control functionality is present in both the device controller/power injector 74 and the PCB 75.

In one embodiment the power supply functionality is incorporated into the device controller/power injector 74 for convenience in the installation of the devices of the IntraLAN system 50. This feature may be especially important in retrofit market installations where existing internal wiring may be compromised (faulty or used for other purposes). Allowing the installer the flexibility to move the four power-carrying wires to other infrastructure segments may decrease the likelihood of conflicts with other systems or wire faults.

An enclosure for the RND 78 is designed to fulfill several purposes. The enclosure provides internal and external jacks for connection to external devices, such as the data/voice concentrator 60, the device controller/power injector 74 the controlled devices 84a, 84b, 84c and 84d and the telephone handset. These jacks may include a standard RJ-11 phone connector (for the telephone handset), one or more Ethernet RJ-45 connectors with other optional interfaces as required for optional hardware.

In one embodiment an RND form factor facilitates retrofitting of the system 50 at properties owned/managed by the hospitality industry. Other embodiments of the RND 78 comprise differently sized enclosures with different mounting configurations.

In one embodiment of the RND 78, the enclosure is mounted to a wall surface (and thus referred to as a "surface mount" RND enclosure) directly over an existing POTS in-wall fixture. The surface mount RND includes additional space to accommodate optional remote hardware components that may be included within the system 50. Examples of these optional components include, but are not limited to: VoIP end point devices, Bluetooth devices, TV signal devices (for video on demand or TV/IP solutions), environmental monitoring and controlling devices, alert and emergency devices, etc. Thus, for example, VOIP signals or video-on-demand signals can be transmitted over the system 50, received at the RND 78 and demodulated and decoded by the DSL modem 80. The resulting information signal (either a voice signal derived from the VOIP data or a video signal derived from the video-on-demand data) is then supplied to the appropriate controlled device (a telephone handset for the voice signal or a television or display for the video-on-demand signal).

An "in wall" RND configuration provides ample room for expanded services and additional remote devices. The in-wall RND is recessed into the wall, typically directly above an existing POTS fixture/phone jack faceplate. The face plate and phone jack are removed and the phone conductors are routed from the phone junction box into the in-wall RND. To install the box, an installer first cuts a hole into the wall surface, the hole sized to accommodate the in-wall RND. The in-wall RND is placed in the hole with the face of the RND flush with the wall. The in-wall RND tends to be much large than a surface-mount box and is better suited for future expansion of additional devices and subsystems and for higher-end installations.

Installation of the IntraLAN RND 78 (surface mount model) proceeds as follows. First the face plate containing the standard telephone connector is removed, exposing the infrastructure Cat 3, Cat 5 or existing wiring. For purposes of discussion assume a standard Cat 3 wiring infrastructure, typically comprising six wires or three two wire pairs. Each wire of a IntraLAN six wire "pigtail" is spliced onto the corresponding one wire of the standard Cat 3 six wires. Then the surface wall mount enclosure of the RND 78 is installed directly over the legacy phone junction box (receptacle) with the pigtail pulled through an opening in the back of the RND enclosure. The pigtail includes a standard connector that is plugged into the appropriate connector on the PCB 85 of the RND enclosure.

The following describes a method for inserting the devices of the present invention into an existing infrastructure to provide high speed Internet to a room (a hotel room, for example) within a framework that creates a new infrastructure from which advanced services, tools, and operations can be performed.

In one installation, the IntraLAN system 50 uses three pairs (six wires) over which the system can deliver existing PBX voice as well as "new" data and power to the room. The operational capabilities can be expanded if additional wires are available, including any combination of up to three conductor pairs (the second and the third pairs for supplying power).

In one embodiment, the DSL modem 80 adheres to the following specifications when used in conjunction with the data/voice concentrator 60:

a) powered from the power distribution bar 86;
b) provide data throughput of no less than about 25 Mbps when connected at 1500 feet through wire meeting the industry standard for VDSL 1. Other embodiments may offer a greater data throughput and capability for a VDSL 2 modem.

The programmable circuit board (PCB) 85 performs multiple functions, including a "device check," power splitting, voltage monitoring and hardware watchdogs for automated management of the controlled devices 84*a*, 84*b*, 84*c* and 84*d*.

The PCB 85 provides functionality that "signals" back to the device controller/power injector 74 that a valid device (i.e., an appropriate and functional RND 78) is connected. Once this connection signal is received, the device controller/power injector 74 energizes the four power-carrying conductors. The PCB relays the power to the RND power distribution bar.

As has been described above, it is possible that the desired four (4) power-carrying wires may not be available or may be damaged/compromised. Further, it is possible that the distance from the RND 78 to the closest point suitable for the device controller/power injector 74 may not be within the operating range of these devices. Therefore, one embodiment of the RND 78 accepts external power from a proximate AC wall outlet (or another AC source of supply) and converts the AC power to DC power that is supplied to the RND 78.

In another embodiment the power distribution bar 86 comprises a connector for receiving a DC voltage from an external source, without modification or reconfiguration of the power distribution bar 86. The power-related functions, described herein are all fully functional regardless of the source of the local power.

The TCP/IP multiport network device 82 adheres to the following specifications:
 a) powered from the power distribution bar 86;
 b) provides a minimum of 4 Ethernet data ports; and
 c) provides throughput of up to one gigabit/second for each port; and
 d) provides data segregation via VLAN or other networking methods.

The system 50 and its installation minimize facility and infrastructure disruptions during installation (for example during a retrofit installation in an existing structure) and during operation. The present invention is more efficient in application, more universally usable and more versatile in operation than known systems. The present invention also provides features and capabilities not present in the prior art systems.

The present invention also includes features that provide a self-test and validation of infrastructure wiring and installation to avoid damaging non-infrastructure devices.

Although the present invention has been described in an application for providing both voice and data signals to an end point (an RND), those skilled in the art recognize that in another embodiment only data signals may be conveyed to an end point.

While the invention has been described with reference to various embodiments thereof, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A system for providing data services and controllable power to each one of a plurality of end points in a structure, the system comprising:
 a network;
 a source of power;
 a data and voice concentrator connected to the network;
 remote network devices/controllers connected to the network, the remote network devices/controllers receiving power from the source of power;
 networked and non-networked controlled devices connected directly to one of the remote network devices/controllers for receiving controllable power from the remote network device/controller, the networked and non-networked devices not connected to an alternate power source, wherein the networked controlled devices send data to and receive data from the remote network device/controller,
 wherein data is bidirectionally communicated between the remote network device/controller and the concentrator;
 wherein power is supplied and independently controlled to each networked and non-networked controlled devices wherein the power is controlled at the source of power or at an associated remote network device/controller;
 wherein each of the remote network devices/controllers comprises:
 a programmable circuit board responsive to the source of power and responsive to the data signals from the concentrator;
 a modem responsive to data signals received from the programmable circuit board;
 a power distribution bar responsive to power received from the programmable circuit board, the power distribution bar supplying power to the modem, to the networked and non-networked controlled devices and to a multiport switch, and wherein the programmable circuit board independently controls power supplied to each one of the networked and non-networked controlled devices; and
 the multiport switch receiving data signals from the modem and providing data signals to the networked controlled devices and receiving data signals from the networked controlled devices.

2. The system of claim 1 wherein the data signals are routed to a desired networked controlled device according to an address within the data signals.

3. The system of claim 1 wherein the concentrator is responsive to the voice and data signals for combining the voice and data signals, the programmable circuit board responsive to combined voice and data signals for supplying the combined voice and data signals to the modem, the modem for separating the data signals and the voice signals.

4. The system of claim 3 wherein the modem supplies voice signals to a telephone handset and data signals to the multiport switch.

\* \* \* \* \*